United States Patent
Taha et al.

(10) Patent No.: US 11,066,592 B2
(45) Date of Patent: Jul. 20, 2021

(54) ENGINEERED NANO-MODIFIED METHYL METHACRYLATE POLYMER FOR REPAIR OF 30 MICROM MICROCRACKS

(71) Applicants: STC.UNM, Albuquerque, NM (US); Michael S. Stenko, Albuquerque, NM (US); Edward N. Matteo, Albuquerque, NM (US); Thomas Dewers, Albuquerque, NM (US)

(72) Inventors: Mahmoud Reda Taha, Albuquerque, NM (US); Michael S. Stenko, Albuquerque, NM (US); John Stormont, Albuquerque, NM (US); Edward N. Matteo, Albuquerque, NM (US); Moneeb Genedy, Albuquerque, NM (US); Thomas Dewers, Albuquerque, NM (US)

(73) Assignees: UNM Rainforest Innovations, Albuquerque, NM (US); National Technology & Engineering Solutions of Sandia, LLC, Albuquerque, NM (US); Transpo Industries, Inc., New Rochelle, NY (US)

( * ) Notice: Subject to any disclaimer, the term of this patent is extended or adjusted under 35 U.S.C. 154(b) by 0 days.

(21) Appl. No.: 16/607,356

(22) PCT Filed: Apr. 20, 2018

(86) PCT No.: PCT/US2018/028659
§ 371 (c)(1),
(2) Date: Oct. 22, 2019

(87) PCT Pub. No.: WO2018/200341
PCT Pub. Date: Nov. 1, 2018

(65) Prior Publication Data
US 2020/0123431 A1    Apr. 23, 2020

Related U.S. Application Data (60) Provisional application No. 62/634,761, filed on Feb. 23, 2018, provisional application No. 62/552,930, (Continued)

(51) Int. Cl.
*E21B 33/14*    (2006.01)
*C09K 8/42*     (2006.01)
*B82Y 30/00*    (2011.01)

(52) U.S. Cl.
CPC .............. *C09K 8/428* (2013.01); *E21B 33/14* (2013.01); *B82Y 30/00* (2013.01); *C09K 2208/10* (2013.01)

(58) Field of Classification Search
CPC . C09K 8/428; C09K 8/44; C09K 8/46; C09K 8/467; C09K 8/473; C09K 8/48;
(Continued)

(56) References Cited

U.S. PATENT DOCUMENTS 4,662,448 A * 5/1987 Ashford ................ E21B 33/138
166/290
5,127,473 A     7/1992 Harris et al.
(Continued)

FOREIGN PATENT DOCUMENTS

| CN | 105645802 A | 6/2016 |
| RU | 2105128 C1 | 2/1998 |
| WO | 2011/103304 A2 | 8/2011 |

OTHER PUBLICATIONS

AASHTO, T316. (2019). Viscosity determination of asphalt binder using rotational viscometer. Washington, DC: AASHTO Standards.
(Continued)

*Primary Examiner* — Angela M DiTrani Leff
(74) *Attorney, Agent, or Firm* — Keith A. Vogt; Keith Vogt, Ltd.

(57) ABSTRACT

A method and sealant to seal microcracks as small as 30 μm by causing methyl methacrylate combined with one or more nanoparticles to flow into the microcrack to be sealed.

4 Claims, 8 Drawing Sheets

Related U.S. Application Data filed on Aug. 31, 2017, provisional application No. 62/489,829, filed on Apr. 25, 2017.

(58) Field of Classification Search
CPC .......... C09K 8/487; C09K 8/493; C09K 8/50; C09K 8/426; C09K 2208/10; E21B 33/14; E21B 33/13; E21B 33/138; E21B 33/146; B82Y 30/00

See application file for complete search history.

(56) References Cited

U.S. PATENT DOCUMENTS

| | | | |
|---|---|---|---|
| 7,032,664 B2* | 4/2006 | Lord .................... | C09K 8/80 166/276 |
| 2014/0027116 A1* | 1/2014 | Suresh ................. | E21B 33/13 166/292 |
| 2014/0367105 A1* | 12/2014 | Karcher .............. | C09K 8/516 166/295 |
| 2017/0100902 A1 | 4/2017 | Asmatulu et al. | |

OTHER PUBLICATIONS

Bai, S., Hu, J. Z., Pugmire, R. J., Grant, D. M., Taylor, C. M., Rubin, J. B., & Peterson, E. J. (1998). Solid state NMR and wide angle X-ray diffraction studies of supercritical fluid CO2-treated poly (ethylene terephthalate). Macromolecules, 31(26), 9238-9246.

Baldan, A. (2004). Adhesively-bonded joints and repairs in metallic alloys, polymers and composite materials: Adhesives, adhesion theories and surface pretreatment. J. of Mater. Sci., 39(1), 1-49. doi:10.1023/b:imsc.0000007726.58758.e4.

Bartczak, Z., Cohen, R. E., & Argon, A. S. (1992). Evolution of the crystalline texture of high-density polyethylene during uniaxial compression. Macromolecules, 25(18), 4692-4704.

Federal Institute of Industrial Property; International Search Report & Written Opinion for PCT/US2018/028659; dated Jul. 10, 2018; 6 pages; Moscow, RU.

Carey, J. W., Wigand, M., Chipera, S. J., WoldeGabriel, G., Pawar, R., Lichtner, P. C., and Guthrie, G. D. (2007). Analysis and performance of oil well cement with 30 years of CO2 exposure from the SACROC Unit, West Texas, USA. Int. J. of Greenhouse Gas Control. 1(1), 75-85. doi:10.1016/s1750-5836(06)00004-1.

Celia, M., Bachu, S., Nordbotten, J., Gasda, S., and Dahle, H. (2005). Quantitative estimation of CO2 leakage from geological storageAnalytical models, numerical models, and data needs. Greenhouse Gas Control Technologies. 7, 663-671. doi:10.1016/b978-008044704-9/50067-7.

Checkai, D., Bryant, S., & Tao, Q. (2013). Towards a frequency distribution of effective permeabilities of leaky wellbores. Energy Procedia, 37, 5653-5660.

Courard, L. (1999). How to analyse thermodynamic properties of solids and liquids in relation with adhesion? In Proceedings of the 2nd International RILEM Symposium ISAP 99 (pp. 9-20). RILEM.

G'sell, C., & Dahoun, A. (1994). Evolution of microstructure in semi-crystalline polymers under large plastic deformation. Materials Science and Engineering: A, 175(1-2), 183-199.

Genedy, M., Stormont, J., Matteo, E., Reda Taha, M . . . (2014). Examining epoxy-based nanocomposites in wellbore seal repair for effective CO2 sequestration. Energy Procedia, 63, 5798-5807.

Genedy, M., Daghash, S., Soliman, E., and Reda Taha, M. M. (2015). Improving fatigue performance of GFRP composite using carbon nanotubes. Fibers, 3(1), 13-29.

Genedy, M., Kandil, U. F., Matteo, E. N., Stormont, J., and Reda Taha, M. M. (2017-A). A new polymer nanocomposite repair material for restoring wellbore seal integrity. International Journal of Greenhouse Gas Control, 58, 290-298.

Genedy, M., Stenko, M., Stormont, J., Matteo, E.N., Dewers, T., Reda Taha, M.M. (2017-B). Methyl Methacrylate Nanocomposite (MMNC) for Sealing Ultra-Thin Wellbore Microcracks and Methods for Making, US Provisional Patent, Apr. 2017.

Gomez, S. P., Sobolik, S. R., Matteo, E. N., Reda Taha, M, Stormont, J. C. (2017). Investigation of wellbore microannulus permeability under stress via experimental wellbore mock-up and finite element modeling. Computers and Geotechnics, 83, 168-177.

Haggenmueller, R., Gommans, H. H., Rinzler, A. G., Fischer, J. E., & Winey, K. I. (2000). Aligned single-wall carbon nanotubes in composites by melt processing methods. Chemical physics letters, 330(3), 219-225.

Harris, K. L., Vinson, E. F., Bour, D. L., Ewert, D. P., & Gerke, R. R. (1992). U.S. Pat. No. 5,127,473. Washington, DC: U.S. Patent and Trademark Office.

Jia, Z., Wang, Z., Xu, C., Liang, J., Wei, B., Wu, D., & Zhu, S. (1999). Study on poly (methyl methacrylate)/carbon nanotube composites. Materials Science and Engineering: A, 271(1), 395-400.

Lacuve, M., Chougnet, A., Allouche, M., & Mazard, C. (2015). A Method to Improve Adhesion Strength at the Cement/Steel-Casing Interface and its Effect on Cement Evaluation Log Response. In Offshore Mediterranean Conference and Exhibition. Offshore Mediterranean Conference.

McClory, C., McNally, T., Baxendale, M., Pötschke, P., Blau, W., & Ruether, M. (2010). Electrical and rheological percolation of PMMA/MWCNT nanocomposites as a function of CNT geometry and functionality. European Polymer Journal, 46(5), 854-868.

Michanowicz, D. R., Buonocore, J. J., Rowland, S. T., Konschnik, K. E., Goho, S. A., & Bernstein, A. S. (2017). A national assessment of underground natural gas storage: identifying wells with designs likely vulnerable to a single-point-of-failure. Environmental Research Letters, 12(6), 064004.

Nakayama, M., and Beaudoin, J. (1987). A novel technique for determining bond strength development between cement paste and steel. Cement Conc. Res., 17(3), 478-488. doi:10.1016/0008-8846(87)90011-1.

Parks, D. M., & Ahzi, S. (1990). Polycrystalline plastic deformation and texture evolution for crystals lacking five independent slip systems. Journal of the Mechanics and Physics of Solids, 38(5), 701-724.

Pocius, A. V. (2012). Adhesion and adhesives technology: An introduction, third ed.). Cincinnati, OH: Hanser Publications.

Reddy, C. M., Arey, J. S., Seewald, J. S., Sylva, S. P., Lemkau, K. L., Nelson, R. K., Carmichael, C. A., McIntyre, C. P., Fenwick, J., Todd Ventura, G.,Van Mooy, B. A. & Camilli, R. (2012). Composition and fate of gas and oil released to the water column during the Deepwater Horizon oil spill. Proceedings of the National Academy of Sciences, 109(50), 20229-20234.

Salemi, N., and Behfarnia, K. (2013). Effect of nano-particles on durability of fiber-reinforced concrete pavement. Cons. Bldg. Mater . . . 48, 934-941. doi:10.1016/j.conbuildmat.2013.07.037.

Seidel, F. A., & Greene, T. G. (1985). Use of expanding cement improves bonding and aids in eliminating annular gas migration in Hobbs Grayburg-San Andres wells. Proc. SPE Annual Technical Conference and Exhibition. Society of Petroleum Engineers.

Shi, J., & Ming, J. (2017). Influence of defects at the steel-mortar interface on the corrosion behavior of steel. Construction and Building Materials, 136, 118-125.

Shokrieh, M. M., Kefayati, A. R., and Chitsazzadeh, M. (2012). Fabrication and mechanical properties of clay/epoxy nanocomposite and its polymer concrete. Mater. and Design. 40, 443-452. doi:10.1016/j.matdes.2012.03.008.

State of Kansas, Department of Health and Environment. (2003). Permanent Administrative Regulations, Article 45.—Underground Hydrocarbon Storage Wells and Associated Brine Ponds. Kansas Secretary of State. 22(30), 1305-132.

Stormont, J. C., Fernandez, S. G., Reda Taha, M., & Matteo, E. N. (2018). Gas flow through cement-casing microannuli under varying stress conditions. Geomechanics for Energy and the Environment. 18, 1-13.

Wetzel, B., Rosso, P., Haupert, F., and Friedrich, K. (2006). Epoxy nanocomposites—fracture and toughening mechanisms. Eng. Frac. Mech. 73(16), 2375-2398. doi:10.1016/j.engfracmech.2006.05.018.

Zeng, J., Saltysiak, B., Johnson, W. S., Schiraldi, D. A., & Kumar, S. (2004). Processing and properties of poly (methylmethacrylate)/carbon nano fiber composites. Composites Part B: Engineering, 35(2), 173-178.

(56) References Cited

OTHER PUBLICATIONS

Zhai, L., Ling, G., Li, J., and Wang, Y. (2006). The effect of nanoparticles on the adhesion of epoxy adhesive. Mater. Lett. 60(25-26), 3031-3033. doi:10.1016/j.matlet.2006.02.038.

Zhang, M., and Bachu, S. (2011). Review of integrity of existing wells in relation to CO2 geological storage: What do we know? Int. J. of Greenhouse Gas Control. 5(4), 826-840. doi:10.1016/j.ijggc.2010.11.006.

* cited by examiner

FIG. 1A FIG. 1B FIG. 1C

PRIOR ART

ENGINEERED NANO-MODIFIED METHYL METHACRYLATE POLYMER FOR REPAIR OF 30 MICROM MICROCRACKS

RELATED APPLICATIONS

This application is a 371 national phase of PCT/US2018/028659 filed on Apr. 25, 2019, which claims priority to U.S. Provisional Application Ser. Nos. 62/489,829 filed Apr. 25, 2017, 62/552,930 filed Aug. 31, 2017 and 62/634,761 filed Feb. 23, 2018, all of which are hereby incorporated by reference.

STATEMENT REGARDING FEDERALLY SPONSORED RESEARCH & DEVELOPMENT

This invention was made with government support under contract DE-NA-0003525 awarded by the U.S. Department of Energy's National Nuclear Security Administration. The government has certain rights in the invention.

BACKGROUND

Seal integrity of both production and abandoned wells is critical to eliminate the possibility of significant leakage along wellbores. Recent major incidents that have resulted from the loss of wellbore integrity include the Deepwater Horizon event which released about 6500 million liters of liquid oil in the Gulf of Mexico and the Aliso Canyon event that released about 100,000 metric tons of methane into the atmosphere near Los Angeles, Calif. Such incidents result in serious health and environmental hazards in addition to the significant economic burden of containing and remediating the releases. Wellbore seal integrity can be compromised from flaws (fractures, voids) that allow for fluid migration along the axis of the wellbore. The flaws are created by a range of factors during well cementing and subsequent well operations, including incomplete drilling mud removal prior to cementing, cement shrinkage, and changes in pressures and temperatures within the casing. In particular, discrete fracture-like flaws (microcracks) that develop at the steel-cement and rock-cement interfaces, often referred to as microannuli, are principal leakage pathways in wellbores. While there have been numerous studies of the behavior and character of the steel-cement, there has been much less effort directed at understanding the rock-cement interface or to develop efficient repair material.

Figure 1A:
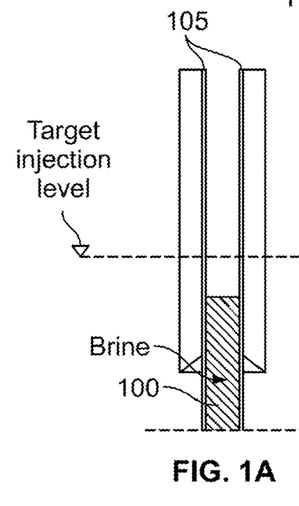
FIG. 1A illustrates an injection process of seal repair material having a step of filling a bottom hole with high-density brine up to 2-3 m below the injection level.
Figure 1B:
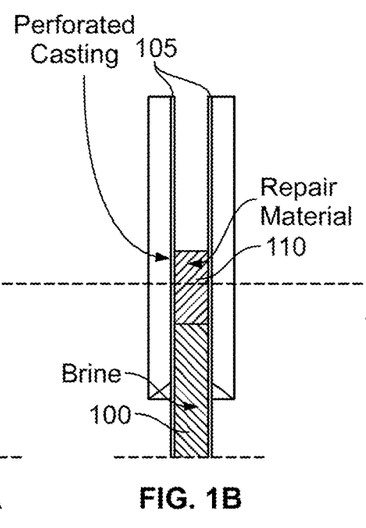
FIG. 1B illustrates an injection process of seal repair material having a step of filling 5-10 m of the casing with a repair material.
Figure 1C:
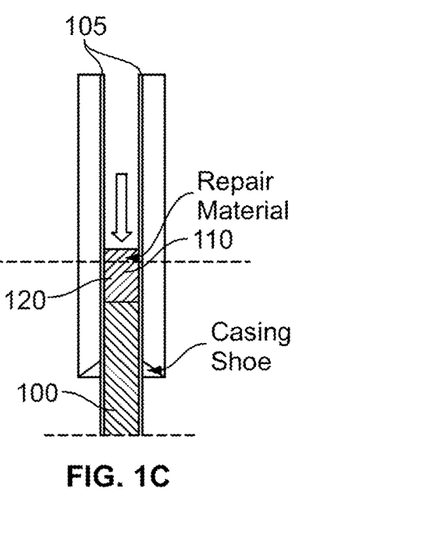
FIG. 1C illustrates an injection process of seal repair material having a step of applying pressure to push repair material into the microannulus.

Repair of flaws in wellbore systems is usually attempted by forcing the seal repair material into flaws through perforations in the steel casing or by injection at the bottom of the steel casing shoe. FIGS. 1A-C show an example of a wellbore repair process through perforation in the steel casing. Microfine cement paste with w/c ratio of 0.7 to 2.0 is the most common repair material used to restore wellbore seal integrity principally due to its much greater flowability compared with regular oil well cement (Type G cement). FIG. 1A illustrates an injection process of seal repair material having a step of filling a bottom hole with high-density brine 100 up to 2-3 m below the injection level. FIG. 1B illustrates a step of filling 5-10 m of casing 105 with repair material 110. FIG. 1C illustrates a step of applying pressure to push repair material into the microannulus 120.

Previous research showed that microfine cement was unable to completely fill 800 µm microcracks, while epoxy polymers (specifically Novolac epoxies) were able to fill microcracks in the range of 800 µm. Epoxy polymers have other advantages over cementitious materials as a microcracks repair material, notably a superior bond strength with metallic surfaces. In addition, polymer materials can be engineered by incorporating nanoparticles to alter their mechanical properties and durability. Prior investigations showed that Novolac epoxy incorporating ANPs significantly improved the bond strength at the rock-cement interface compared with microfine cement and neat Novolac epoxy and is still able to completely fill 800 µm microcracks.

There is a need to seal microcracks smaller than 100 µm. Continuous fracture-like flaws greatly increase the effective permeability of the wellbore system. For example, a 50 µm microcrack at the cement-casing interface in a wellbore with a diameter of 0.23 m and a casing diameter of 0.18 m will increase the effective permeability of cement by more than 4 orders of magnitude over its intact permeability. Research also shows a microcrack of 25 µm is large enough to be problematic for gas flow along a well.

Moreover, the seal integrity of both production and abandoned wells is critical to eliminate the possibility of leakage along the wellbore system. The microcracks at the steel-cement and rock-cement interfaces often referred to as microannuli, are principal leakage pathways. Microcracks as small as 30-µm are sufficient to create a significant leakage pathway for gas.

BRIEF SUMMARY OF THE INVENTION

In one embodiment, the present invention provides a system and method of using nanomodified methyl methacrylate (NM-MMA) polymer as seal repair material for small cracks such as 30 µm microcracks.

In other embodiments, the present invention may use nanoparticles such as Aluminum Nanoparticles (ANPs) to increase the ductility of the crack repair material and to control the curing time of the crack repair material.

In preferred embodiment, the present invention uses MMA repair materials to flow into very thin microcracks. MMA repair materials can fill microcracks. In addition, incorporating ANPs in MMA resulted in significant improvement in repair material ductility. X-ray diffraction (XRD) analysis shows that incorporating ANPs in MMA resin increases the degree of polymer crystallization resulting in significant improvement in seal repair material ductility.

In other embodiments, the present invention provides a system and method that seal microcracks as small as 30 µm and smaller which are sufficient to create a leakage pathway for gas. The present invention provides a repair material with significantly low viscosity to be able to penetrate such small microcracks in addition to high bond strength and flexibility to prevent debonding and secure seal integrity. Novolac epoxy was able to fill 800 µm microcracks. However, recognizing that epoxy surface tension is considerably high to fill small microcracks as small as 30 µm in thickness, the present invention uses methyl methacrylate (MMA) as a seal repair material to seal 30 µm microcracks. MMA is used due to its low surface tension and viscosity compared to other polymers. Moreover, the mechanical and electrical properties of MMA can be engineered by incorporating nanoparticles.

In other, the present invention provides system and methods that use nano-modified Methyl Methacrylate (NM-MMA) as a repair material for sealing repair of 30 µm microcracks in wellbores. MMA and NM-MMA incorporating 0.5% ANPs by weight of the MMA resin provide a repair material capable of sealing 30 µm cement-shale interface microcrack. The polymer nanocomposite has improved bond strength (1061% higher than microfine cement), excellent ductility (468% higher displacement at failure than microfine cement), and superior toughness (8135% higher than microfine cement). The improved mechanical properties of NM-MMA show that it has superior performance as a seal repair material compared with microfine cement currently used as the standard technology to seal wellbore microcracks.

Microscopic investigations of the shale-cement interface showed that microfine cement did not flow through 30 μm microcracks and has a very limited penetration depth. Moreover, Novolac epoxy was also unable to completely fill the gap between the shale and the cement. In contrast, MMA-based repair materials are able to completely fill the wellbore microcracks. Moreover, it was found that incorporating 0.5% ANPs by weight in MMA was able to increase the displacement at failure and toughness by 122% and 201% respectively. XRD analysis shows that incorporating ANPs in MMA increased the degree of polymer crystallization enabling significant increase in polymer ductility and toughness.

In one embodiment, the present invention provides a system and method of using Methyl Methacrylate Nanocomposite (MMNC) to flow, fill and seal ultrathin microannulus cracks such as those found in wellbores.

In other embodiments, the present invention provides a system and method to fill or repair wellbore and other with cracks having widths lower than 40 mm.

In other embodiments, the present invention provides MMNC with enhanced capabilities by engineering the MMNC using nanoparticles such Alumina nanoparticles (ANPs), carbon nanotubes (CNTs), graphene nanoplatelets (GNPs) and/or microcapsules. Enhancing the MMNC provides superior sealing and effective monitoring. Other improvements include improved bonding, ductility, enhanced fatigue life, self-sensing, and self-healing.

In other embodiments, the present invention provides a system and method where the rheological and mechanical properties of MMNC can be designed by controlling hardener content, mixing temperature and nanomaterial type and content.

In other embodiments, the present invention provides a system and method that provide an engineered MMNC which is adapted to provide long-term wellbore seal repair and integrity with capabilities beyond existing technologies.

In other embodiments, the present invention provides a system and method used in the repair and sealing of an ultra-thin opening in a substrate. In a preferred embodiment, the teachings of the present invention may be used in a cement-shale interface with ultra-thin annulus microcracks with a crack width lower than 40 mm.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one aspect, the present invention provides a system and method used to seal microcracks as small as 30 μm since continuous fracture-like flaws greatly increase the effective permeability of the wellbore system. For example, a 50 μm microcrack at the cement-casing interface in a wellbore with a diameter of 0.23 m and a casing diameter of 0.18 m will increase the effective permeability of cement by more than 4 orders of magnitude over its intact permeability. As a result, the present invention focusses on microcracks as small as 30 μm which are sufficient to create a leakage pathway for gas. Accordingly, in one embodiment, a repair material with significantly low viscosity is provided which can penetrate such small microcracks in addition to high bond strength and flexibility to prevent debonding and secure seal integrity.

While Novolac epoxy can fill 800 μm microcracks, to penetrate the desired microcrack the surface tension of material needs to be high enough to allow for the complete filling of small microcracks as small as 30 μm in width. In a preferred embodiment of the present invention, methyl methacrylate (MMA) is used as a seal repair material to seal 30 μm microcracks. MMA may be used because of its significantly very low surface tension and viscosity compared to other polymers. Moreover, the mechanical and electrical properties of MMA can be engineered by incorporating nanoparticles. In another preferred embodiment, MMA may be incorporated with one or more ANPs (Aluminum Nanoparticles) to form a seal repair material for 30 μm microcracks at the rock-cement interface. The bond strength and the ability to completely fill 30±5 μm microcracks for MMA and nano modified MMA incorporating ANPs was measured and compared with microfine cement and Novolac epoxy. Microstructural analysis using X-ray diffraction (XRD) was also used to investigate the effect of incorporating ANPs on the properties of MMA resin.

To demonstrate one or more working embodiments of the present invention, rock-cement interfaces with a 30 μm gap were evaluated. The bond strength of the repaired interface was measured with push-out tests. Microscopic observations of the repaired interfaces were made. In addition, the surface tension and viscosity were measured. Lastly, X-ray diffraction measurements were made to characterize the nanocomposite.

For certain evaluations, the rock used was Mancos Shale, sourced from TerraTek. Type G (API Class G) Oil Well Cement (OWC) provided by Grupo Cementos de Chihuahua (GCC) USA was used as the reference cement material. Four repair materials were used: microfine cement, Novalac epoxy, methyl methacrylate, and MMA with alumina nanoparticles. The microfine cement has a composition that is comparable to high sulfate-resistant cement and grain size ($d_{95}$) of 9.5 μm. The mix used for the microfine cement has water to cement ratio (w/c) of 0.7 and 2.0% of the dry cement weight super plasticizer (as recommended by the manufacturer).

Novolac epoxy system is a low viscosity cycloaliphatic polyamine blend with low viscosity hardener. Methyl Methacrylate (MMA) is a low viscosity polymer provided by Transpo Industry Inc. Benzoyl peroxide powder is used as a hardener for MMA resin. ANPs were used to modify the MMA matrix. ANPs are Aluminum Oxide $Al_2O_3$ with a maximum particle size of 50 nm were obtained from Sigma Aldrich, Inc.

The microfine cement repair material was prepared by mixing cement with water for two minutes using a stand mixer. The maximum water to cement ratio of 2.0, recommended by the manufacturer, was used to insure maximum followability. Novolac epoxy repair material was prepared by mixing resin and hardener with resin to hardener ratio of 2:1 as instructed by the manufacturer. The mixture was stirred for at least 1 minute using a stand mixer to achieve a uniform mixture.

MMA and NM-MMA repair materials were prepared by mixing the resin with 2% hardener by weight using a stand mixer for at least 1 minute until hardener powder is completely dissolved in the resin. To prepare NM-MM polymer nanocomposite, 0.5% by weight ANPs were added to the MMA resin and manually stirred for 1 min. Afterward, the mix was sonicated for 1 hour at 40° C. using an ultrasonic homogenizer. The mix was then stirred for 2 additional hours at 80° C. using magnetic stirring at 800 rpm. The polymer resin nanocomposite was left to cool and reach room temperature and then mixed with the required amount of hardener powder for 1 minute until the hardener powder completely dissolved in the resin.

Viscosity, surface tension and the contact angle with cement surface were measured for all repair materials. Viscosity tests were conducted using a rotational Viscometer following AASHTO T316 (AASHTO, 2013). The viscosity was measured for all material at room temperature (22° C.). SC4-21 needle spindles, rotating at 20 rpm, were used for viscosity measurements. The spindles were allowed to rotate for 1 minute, after which three readings were collected at 15-second intervals.

The surface tension of the repair materials was measured using KRUSS force tensiometer K100 standard plate surface tension test. The test was conducted by submerging a standard platinum plate in the investigated liquid to achieve a wetted depth of 6 mm. The plate was then pulled-out of the liquid with a speed of 10 mm/min. The force required to pull-out the plate is measured, and the surface tension of the liquid is calculated using Wilhelmy plate method. The contact angle of repair material with type G cement surface was measured by allowing a drop of repair material to fall on a hardened cement surface from 1 cm height. A high-resolution camera was used to take a photo of the repair material drop before it was absorbed by the cement. DinoCapture, 2.0 angle measurement tool, was then used to measure the contact angle of each repair material.

To measure the bond strength of repair materials, push-out test specimens were prepared. Type G cement hollow cylindrical specimens used had a height of 50.8 mm, an outer diameter of 101.4 mm, and inner diameters of 25.46±0.01 mm. The cement specimens were cast inside steel pipes with a thickness of 3.2 mm. Steel pipes were used to provide confinement to simulate the confinement provided by the infinite rock formation surrounding wellbores. The specimens were then cured at the controlled environment with 100% humidity and ambient temperature for 28 days. The hole diameter was measured after curing using a micrometer and confirmed to meet the desired diameter. After curing, a 25.4 mm shale core was placed in the center of the hole to create a gap between the shale and cement of 30±5 μm. Repair material was then supplied along the top shale-cement contact and allowed to flow by gravity into the microcrack. The repair material was added into the microcrack until the repair material no longer flowed into the microcracks.

Figure 2A:
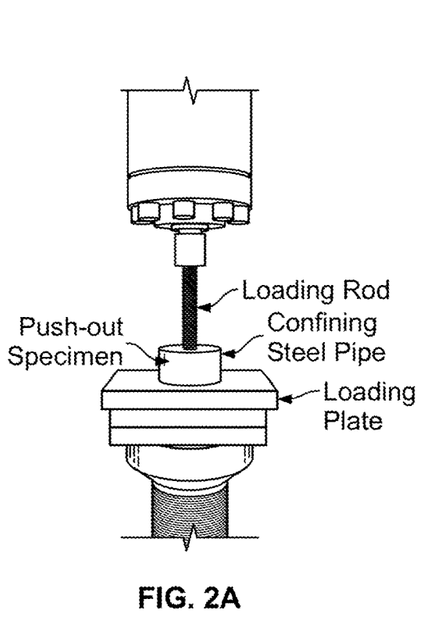
FIG. 2A illustrates a push-out test.
Figure 2B:
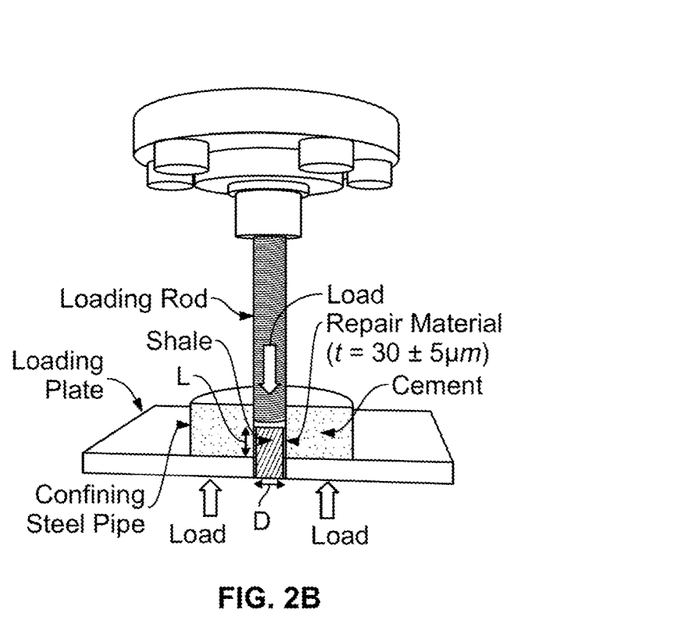
FIG. 2B illustrates a push-out test schematic where D is the diameter of the shale core of 25.4 mm, and L is the embedment length of shale core in the cement of 25.4 mm

Three specimens repaired with each repair material were tested at age 7 days after repair. Specimens repaired with microfine cement were cured in 100% humidity while specimens repaired with Novolac Epoxy, MMA, or NM-MMA were air cured at room temperature. The push-out test setup and schematic are shown in FIGS. 2A-2B. The push-out test was conducted under two-stage displacement control protocol. The test started at a rate of 0.1 mm/min for the first 5 mm, after which the loading rate was increased to 1.0 mm/min. Test load and displacement were recorded using a sampling rate of 1 Hz. The initial lower displacement rate allowed bond failure to take place at low strain rate. The greater displacement rate post-peak reduced the total test time to about 1 hour. The bond strength was calculated using Equation (1).

$$\tau = \frac{P}{\pi DL} \quad (1)$$

where τ is the interfacial bond strength, P is the peak load, D is the diameter of the shale core of 25.4 mm, and L is the embedment length of 25.4 mm.

Sagittal/longitudinal sections of the rock-repair-cement were obtained by vertically sectioning untested specimens. Light microscopes with two different levels of magnification (200× and 500×) were used to observe the shale-cement interface with the different repair materials.

A microstructural investigation using X-ray Diffraction (XRD) was conducted to achieve further understanding of the effect of incorporating ANPs in MMA resin. XRD was conducted using Rigaku, SmartLab XRD machine. The machine is equipped with copper k alpha tube and one dimensional silicon strip detectors D/teX. The scan was conducted from 0 to 90 degrees with 0.02 degrees' step and a scan rate of 6 degrees/min.

Figure 3:
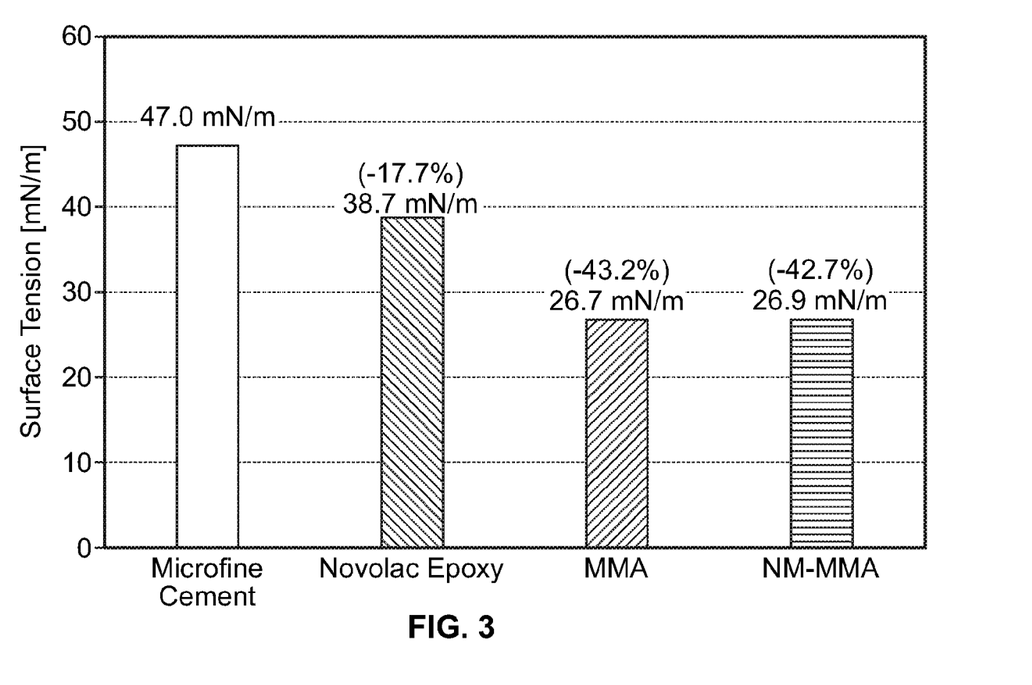
FIG. 3 shows surface tension measurements of all repair materials. (% above the bars represents the difference of bond strength of repair material compared with microfine cement).
Figure 4:
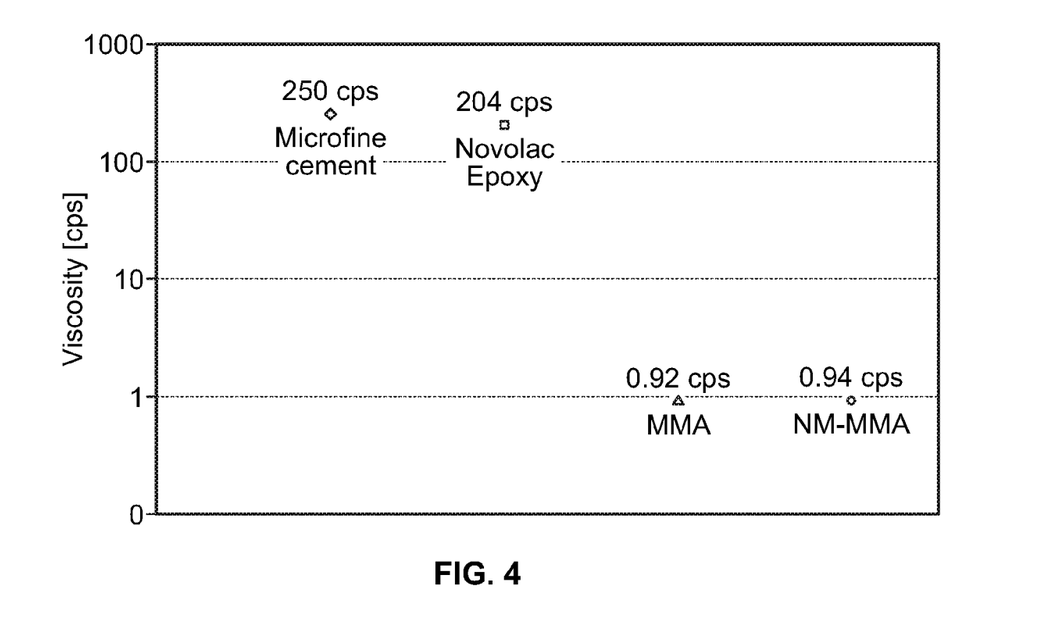
FIG. 4 shows viscosity measurements of all repair materials. Log scale is used to enable display with order of magnitude change in viscosity.
Figure 5A:
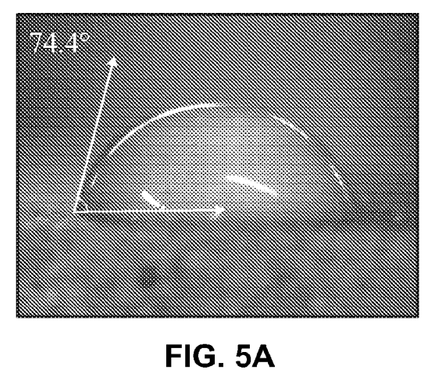
FIG. 5A shows contact angle measurements presenting contact angle value on the top left corner of the image for microfine cement with Type G cement surface.
Figure 5B:
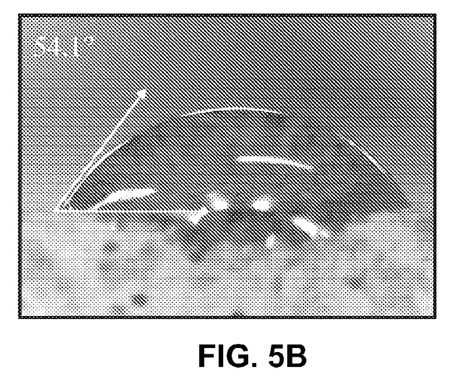
FIG. 5B shows contact angle measurements presenting contact angle value on the top left corner of the image for Novolac epoxy with Type G cement surface.
Figure 5C:
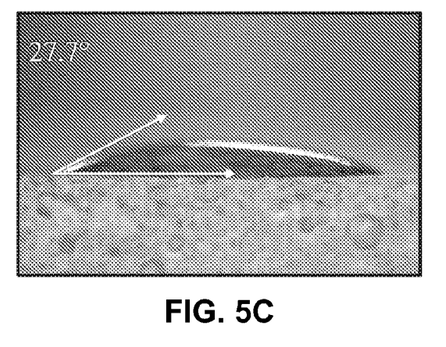
FIG. 5C shows contact angle measurements presenting contact angle value on the top left corner of the image for MMA with Type G cement surface.
Figure 5D:
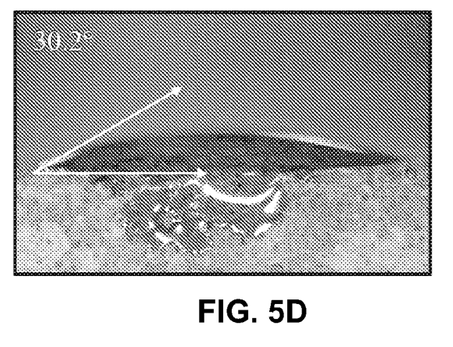
FIG. 5D shows contact angle measurements presenting contact angle value on the top left corner of the image for NM-MMA with Type G cement surface.

In other embodiments, the present invention provides and deploys materials having the ability to flow through microcracks with a desirable rate of flow in the cracks. Both capabilities lead to the successful seal repair and achieve desirable seal integrity. For one embodiment of the present invention, a suitable material is nano modified Methyl Methacrylate (NM-MMA). As shown in FIGS. 3-5, NM-MMA was found to have superior capabilities to flow through microcracks, surface tension, viscosity, and the contact angle of all repair materials.

Novolac epoxy has 17.7% lower surface tension than microfine cement. This low surface tension allows the epoxy to fill smaller microcracks than what microfine cement can fill. However, Novolac epoxy's surface tension is still not low enough to allow the epoxy to fill 30 μm microcracks. On the other hand, it was found that MMA and NM-MMA repair materials have 43.2% and 42.7% lower surface tension than microfine cement respectively and 31% and 30.5% respectively lower than Novolac epoxy. This significantly low surface tension allows MMA to flow through such small microcracks (30 μm) and completely fill the gap and achieve seal integrity.

The viscosity of all repair materials is shown in FIG. 4. It was found that Novolac epoxy has 18.4% lower viscosity than microfine cement while MMA and NM-MMA both have 99.6%, lower viscosity than microfine cement. These extremely low viscosities of MMA and NM-MMA result in a higher rate of flow of the repair materials through the microcracks. This high flow rate allows the repair material to penetrate further in the microcrack before hardening and results in an efficient seal of the microcrack. It was also found that incorporating ANPs has no noticeable effect on either viscosity or surface tension of MMA.

The contact angle measurement of all repair materials with Type G cement surface is shown in FIGS. 5A-D. The measurements show that the contact angle of Novolac epoxy, MMA, and NM-MMA are 27%, 62%, and 59% lower than the contact angle of microfine cement with Type G cement surface respectively. The measurements also show that the contact angle of MMA and NM-MMA are 48% and 44% lower than Novolac epoxy. On the other hand, incorporating ANPs in MMA resulted in a very limited increase in the contact angle of MMA with cement by 7% only. The contact angle and surface tension measurements control the ability of repair material to flow into the microcrack.

Figure 6:
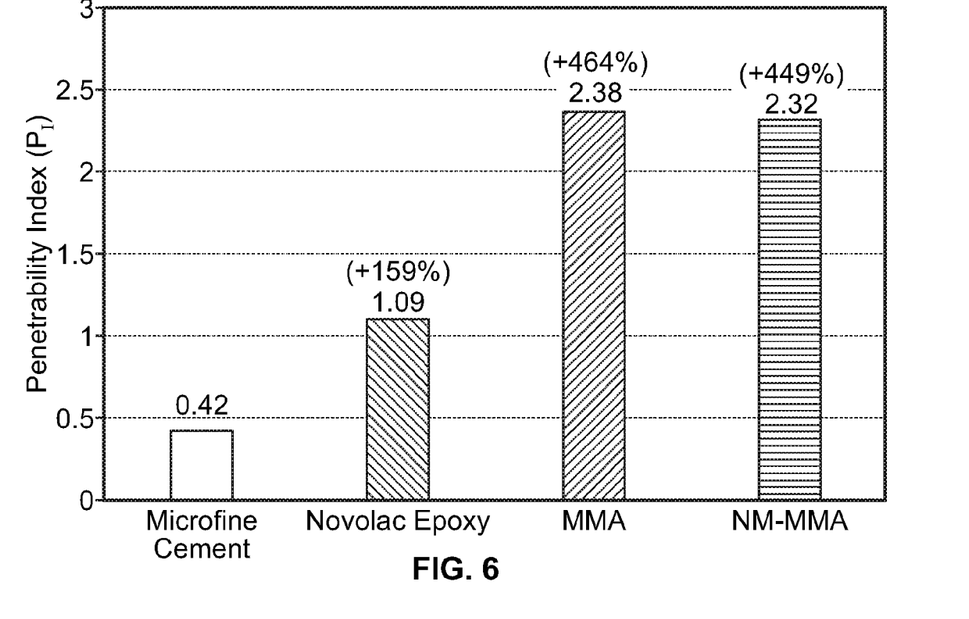
FIG. 6 shows a penetrability Index (PI) of all repair materials. (% above the bars represents the difference of Penetrability Index of repair material compared with microfine cement).

The ability of a repair material to replace other fluids (e.g., air or water) is proportional to its surface tension and contact angle. To compare the penetrability of repair material, the Penetrability Index ($P_I$) was calculated as a measure based on Young-Laplace equation as described by Equation 2.

$$P_I = \frac{\cos \theta_r}{\gamma_r} \gamma_w \quad (2)$$

where $P_I$ is the Penetrability Index, $\gamma_r$ is the repair material surface tension [N/m], $\theta_r$ is the repair material contact angle, and $\gamma_w$ is the water surface tension [N/m]. The calculated Penetrability Index for all repair materials is shown in FIG. 6.

The results show that Novolac epoxy, MMA, and NM-MMA have 159%, 464%, and 449% higher penetrability index than microfine cement respectively. Although Novolac epoxy shows a significant increase in the penetrability index, this increase was not enough to allow the Novolac epoxy to fully penetrate 30 μm microcracks. MMA and NM-MMA were found to have 118% and 112% higher penetrability index than Novolac epoxy respectively. These results show that MMA and NM-MMA repair material will be able to penetrate smaller microdefects than both microfine cement and Novolac epoxy under similar conditions. On the other hand, incorporating ANPs in MMA repair material resulted in a very insignificant reduction in the penetrability index of MMA by 2.6%.

Figure 7:
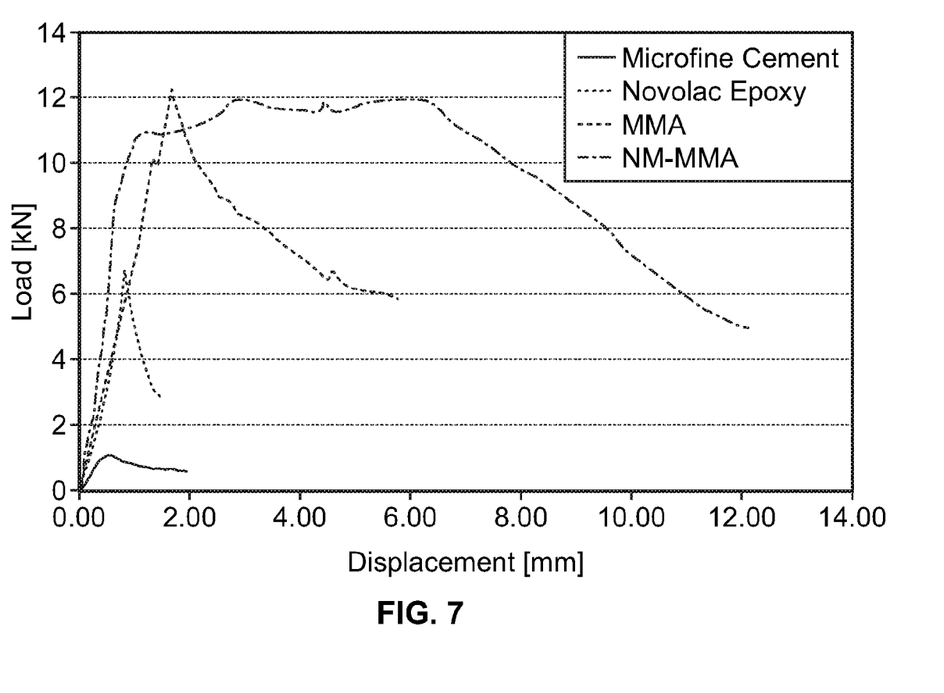
FIG. 7 illustrates median load-displacement curves of specimens repaired with microfine cement, Novolac epoxy, MMA and Nano-modified MMA (NM-MMA) polymer nanocomposite.

All push-out specimens were loaded until failure. Failure is defined as the point at which the load dropped below 50% of the maximum load. Median load-displacement curves of specimens repaired with different repair materials are shown in FIG. 7. All the materials showed similar shear stiffness (represented by the slope of load-displacement curves). The load-displacement curves show that microfine cement has very low shear strength compared with polymer repair material. It was also observed that MMA-based repair materials have almost 100% higher bond strength than Novolac epoxy repair material and about 1000% higher than microfine cement. Incorporating aluminum nanoparticles (ANPs) has no significant effect on the shear capacity of the repair material. However, incorporating ANPs significantly improved the displacement at the failure of the repair material indicating a significant improvement in ductility.

Figure 8:
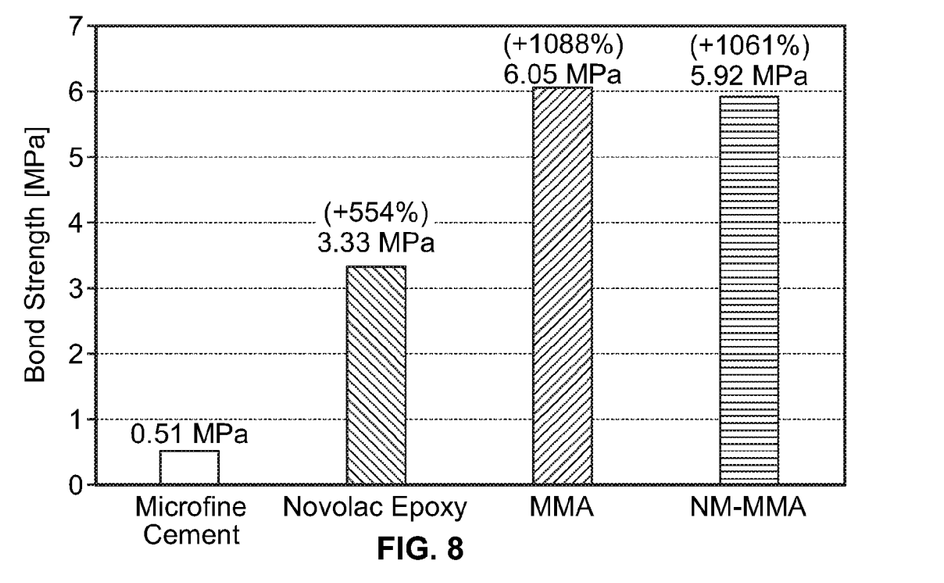
FIG. 8 illustrates the apparent bond strength of all repair materials. (% above the bars represents the difference of bond strength of repair material compared with microfine cement currently used in the field).

The apparent bond strength of repair materials was calculated using Equation (1). FIG. 8 shows the bond strength of all repair materials. The results show an increase in the apparent bond strength of Novolac epoxy, MMA, and NM-MMA by 554%, 1088%, and 1061% compared to microfine cement. Statistical analysis using student t-test with 95% level of confidence shows that the increase of bond strength of Novolac epoxy, MMA, and NM-MMA compared to microfine cement was statistically significant. However, the reduction in the bond strength of NM-MMA is statistically insignificant when compared with neat MMA repair material.

Figure 9:
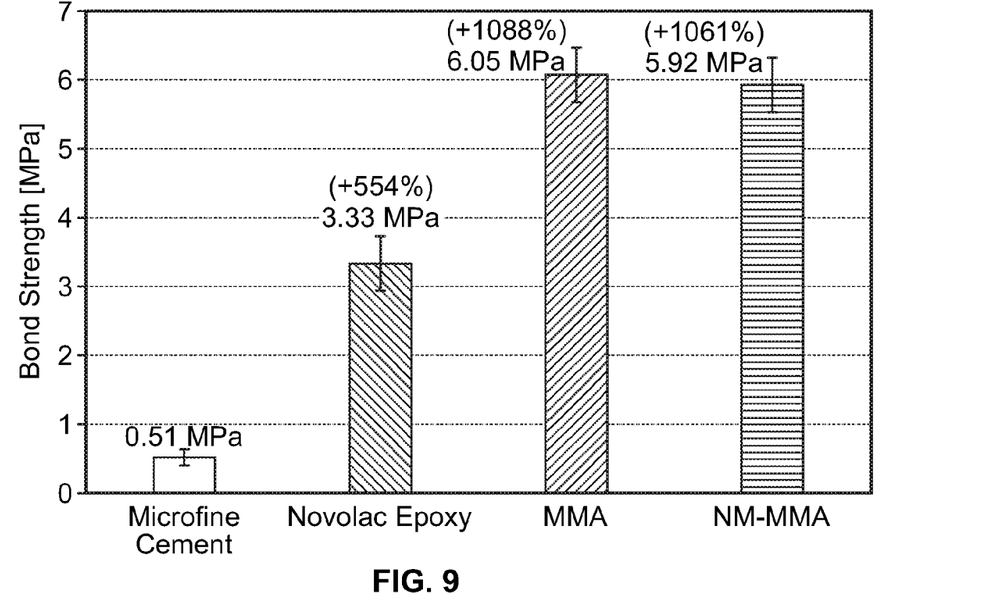
FIG. 9 illustrates displacement at failure of all repair materials. (% above the bars represents the difference of bond strength of repair material compared with microfine cement).

FIG. 9 shows the displacement at failure for all repair materials. Using Novolac epoxy as repair material reduced the displacement at failure by 34.9% compared with microfine cement. However, this reduction was found to be statistically insignificant. On the other hand, the displacement at the failure of specimens repaired with MMA and NM-MMA was found to increase the displacement at the failure by 156% and 468% respectively compared to microfine cement.

Figure 10:
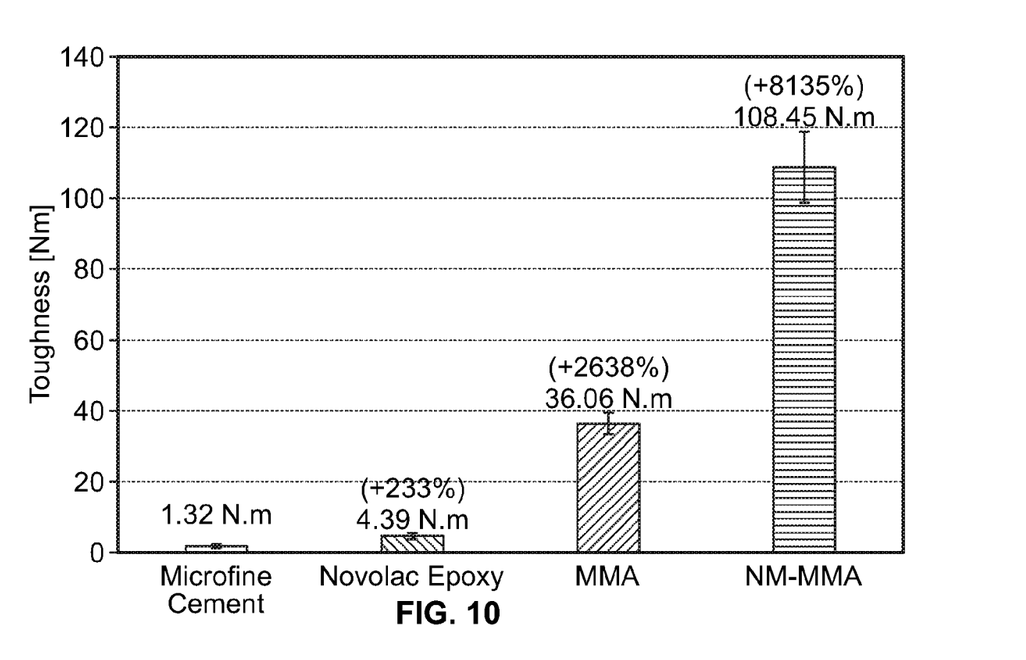
FIG. 10 illustrates toughness of all repair materials. (% above the bars represents the difference of bond strength of repair material compared with microfine cement).

The toughness of push-out specimens was calculated as the area under the load-displacement curve until failure (FIG. 10). It was found that the toughness was increase by 223%, 2638% and 8135% for Novolac epoxy, MMA, and NM-MMA respectively compared to microfine cement. These results show that incorporating 0.5% ANPs in MMA was able to increase the displacement at failure and toughness of push-out specimens by 122% and 201% respectively. It is important to note that such increase in ductility and toughness of repair material will have a significant effect on repair efficiency. A repair material with relatively high strength and very high failure displacement and ability to absorb energy will show much-improved efficiency compared to current repair technology.

In yet other embodiments, the present invention provides a nano-modified Methyl Methacrylate (NM-MMA) repair material for sealing repair of 30 μm microcracks in wellbores. In a preferred embodiment, MMA and NM-MMA incorporating 0.5% ANPs by weight of the MMA resin provide a repair material capable of sealing 30 μm cement-shale interface microcrack. In other embodiments, the MMA and NM-MMA incorporate ANPs by weight in the range of 0.1% to 2.0%. In other embodiments, the MMA and NM-MMA contain sufficient ANPs by weight to change the ductility and/or control the hardening time of the sealant. In yet other embodiments, the present invention provides a nano-modified Methyl Methacrylate (NM-MMA) repair material for sealing repair of 30 μm microcracks in wellbores and with a controlled hardening time ranging from 15 minutes up to 40 hours.

The polymer nanocomposite has improved bond strength (1061% higher than microfine cement), excellent ductility (468% higher displacement at failure than microfine cement), and superior toughness (8135% higher than microfine cement). The improved mechanical properties of NM-MMA show that it has superior performance as a seal repair material compared with microfine cement currently used as the standard technology to seal wellbore microcracks.

Figure 11A:
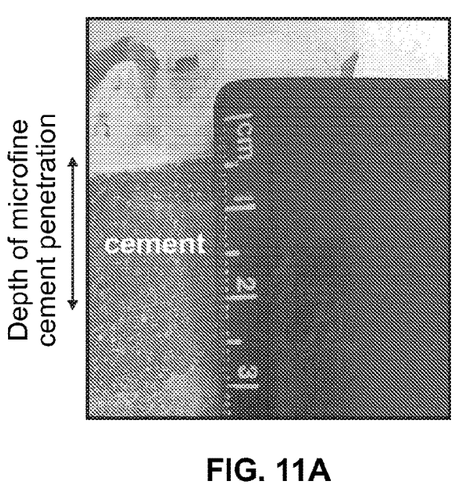
FIG. 11A shows a microscopic image of a cement interface repaired with microfine cement as well as the depth of microfine cement penetration.
Figure 11B:
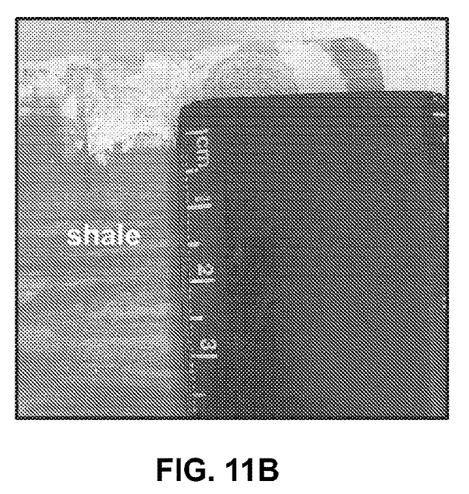
FIG. 11B shows a microscopic image of a shale interface repaired with microfine cement as well as the depth of microfine cement penetration.
Figure 12A:
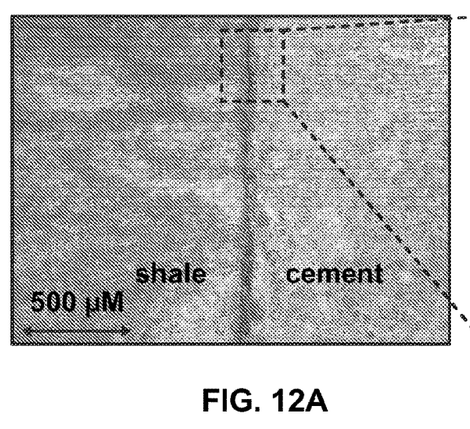
FIG. 12A shows a microscopic image of a cement-shale interface repaired with Novolac epoxy.
Figure 12B:
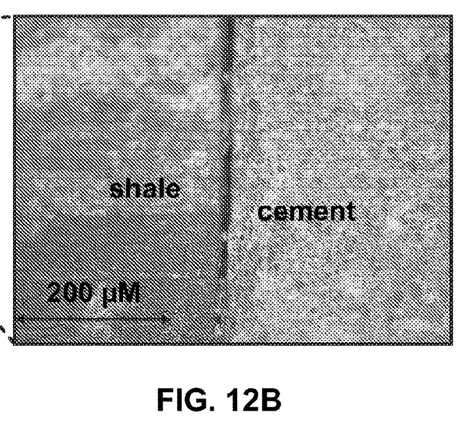
FIG. 12B shows microscopic images of cement-shale interface repaired with Novolac epoxy having a magnification that shows the inability of epoxy to penetrate 30 μm microcracks.
Figure 13A:
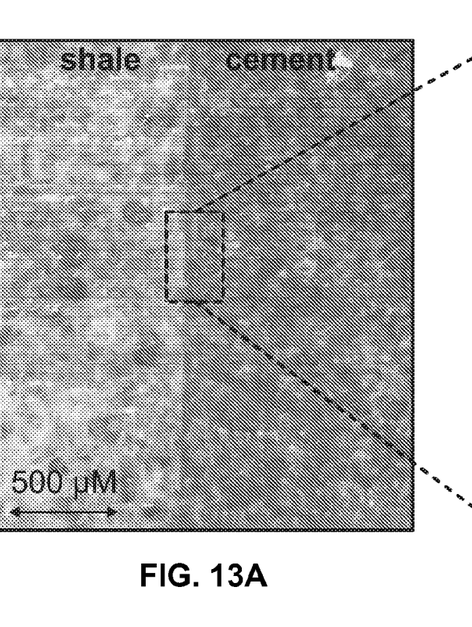
FIG. 13A shows a microscopic image of a cement-shale interface repaired with NM-MMA.
Figure 13B:
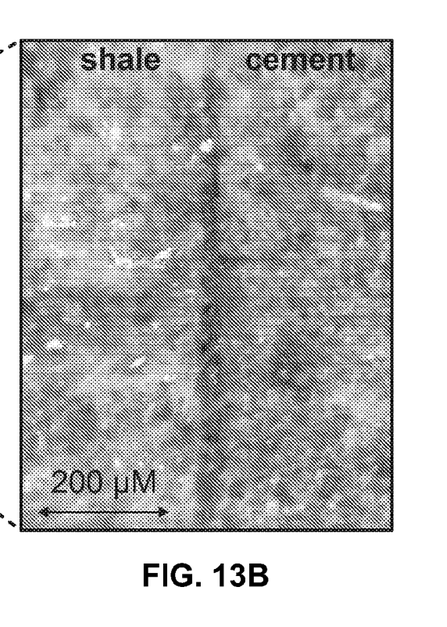
FIG. 13B shows a microscopic image of a cement-shale interface repaired with NM-MMA at a magnification that shows the ability of NM-MMA to fill the microcracks and infiltrate both shale and cement sides.
Figure 14:
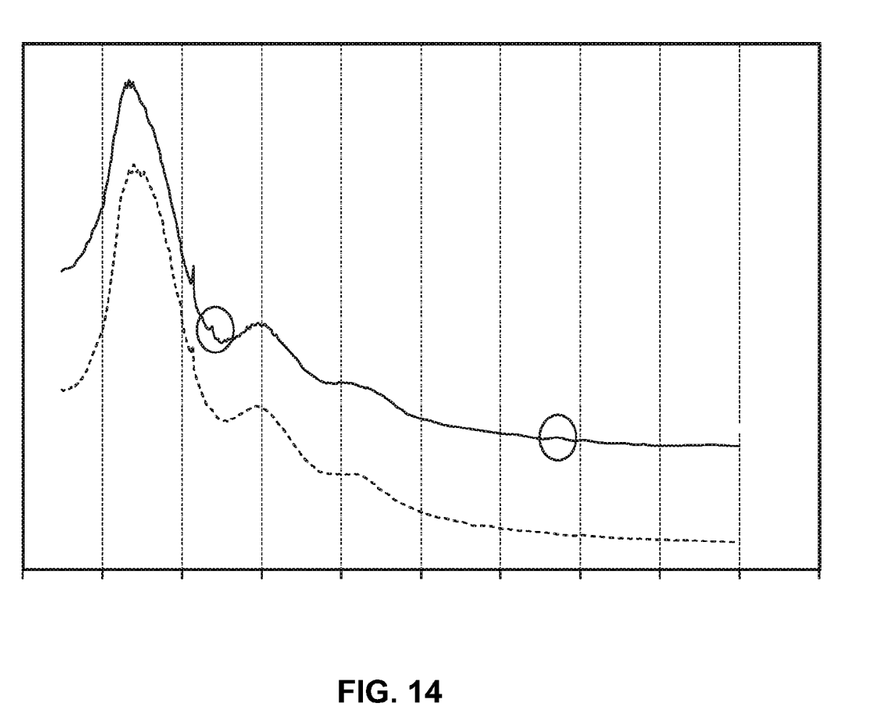
FIG. 14 shows XRD scans for both MMA and NM-MMA specimens.

Microscopic investigations of the shale-cement interface showed that microfine cement did not flow throw 30 μm microcracks and had a very limited penetration depth as shown in FIGS. 11A-B. Moreover, Novolac epoxy was also unable to completely fill the gap between the shale and the cement as shown in FIGS. 12A-B. In contrast, MMA-based repair materials of the present invention were able to completely fill the wellbore microcracks as shown in FIGS. 13A-B.

Contact angle and surface tension measurements showed that embodiments of the present invention providing MMA and NM-MMA have a much higher penetrability in cement than microfine cement and Novolac epoxy. This helps the materials of the various embodiments of the present invention, such as MMA, to flow in microscale defects and cracks. Moreover, it was found that incorporating 0.5% ANPs by weight in MMA was able to increase the displacement at failure and toughness by 122% and 201% respectively. XRD analysis shows that incorporating ANPs in MMA increased the degree of polymer crystallization enabling a significant increase in polymer ductility and toughness.

Figure 15A:
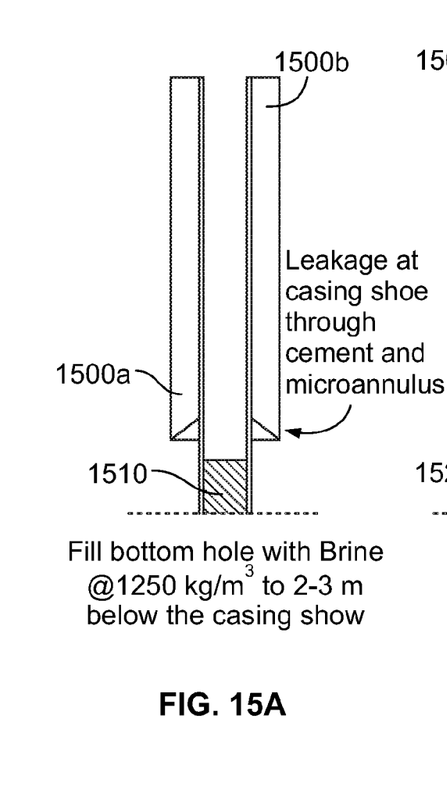
FIG. 15A illustrates an injection process of seal repair material having a step of filling a bottom hole with high-density brine up to 2-3 m below the injection level for a sealing method for an embodiment of the present invention.
Figures 15B, 15C:
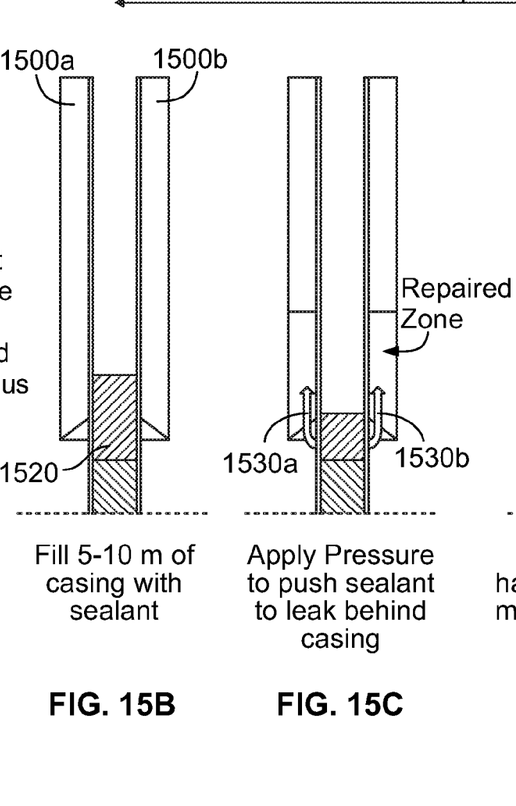
FIG. 15B illustrates an injection process of seal repair material having a step of filling 5-10 m of the casing with repair material for a sealing method for an embodiment of the present invention.
FIG. 15C illustrates an injection process of seal repair material having a step of applying pressure to push repair material into the microannulus for a sealing method for an embodiment of the present invention.

In yet another embodiment, the present invention provides a system and method of using the MMA and NM-MMA materials described above to repair a leakage 1500A and 1500B at the casing seal as shown FIGS. 15A-D. In a preferred embodiment, the first step as shown in FIG. 15A is to fill the bottom hole with a solution such as brine 1510 at 1250 kg/m3 up to 2-3 m below the casing or the area to be repaired. Next, as shown in FIG. 15B, a portion of the casing, such as 5-10 m of the casing, is filled with sealant 1520 which is one of the embodiments described above. The portion filled should extend above and below the area to be repaired.

Figure 15D:
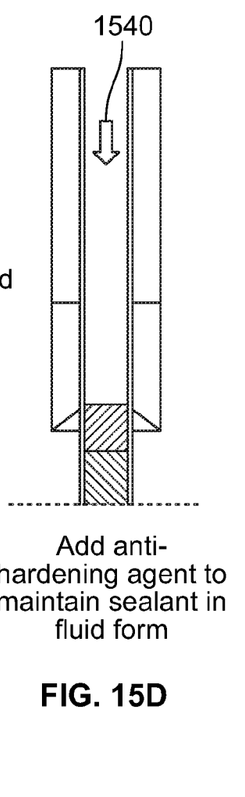
FIG. 15D illustrates an injection process of seal repair material having a step of adding an anti-hardening agent to maintain sealant in a fluid form for a sealing method for an embodiment of the present invention.
Figure 15E:
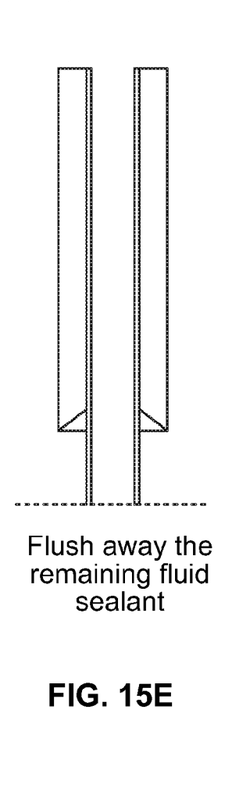
FIG. 15E illustrates an injection process of seal repair material having a step of flushing away the remaining fluid sealant for an embodiment of the present invention.

As shown in FIG. 15C, the casing, or at least the portion in need of repair, is pressurized to force the sealant into the leak behind the casing or the damaged area 1530A and 1530B. As shown in FIG. 15D, an anti-hardening agent 1540 is then applied while maintaining the pressure to maintain the sealant in fluid form. Any remaining sealant may then be flushed away as shown in FIG. 15D.

As is also shown below, T is the engineered time interval between adding sealant and flushing away the remaining sealant. For one embodiment of the present invention, T has been successfully engineered and tested up to 1 hour.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A method of using a sealant to seal microcracks as small as 30 μm in a wellbore having a casing comprising the steps of: 1) filling a bottom hole of the wellbore with filler solution to an area below the area to be repaired; 2) mixing a polymer sealant comprising methyl methacrylate with one or more alumina nanoparticles in order to increase the degree of polymer crystallization, wherein said methyl methacrylate contains sufficient alumina nanoparticles by weight to change the ductility and/or control the hardening time of said methyl methacrylate to create a nano-modified polymer prior to placement of said nano-modified polymer in the microcracks to be sealed; 3) filling a portion of the casing with said nano-modified polymer sealant, said nano-modified polymer sealant positioned above and below the area to be repaired; 4) subjecting said nano-modified polymer sealant to pressure to cause said nano-modified polymer sealant to flow into the microcracks to be sealed; 5) adding an anti-hardening agent to maintain any remaining nano-modified polymer sealant in fluid form; and then 6) removing the remaining nano-modified polymer sealant.

2. The sealant of claim 1 said methyl methacrylate incorporates nanoparticles by weight in the range of 0.1% to 2.0%.

3. The method of claim 1 said methyl methacrylate incorporates nanoparticles by weight in the range of 0.4% to 0.6%.

4. The method of claim 1 wherein said methyl methacrylate incorporates 0.5% nanoparticles by weight of said methyl methacrylate.

* * * * *